(12) United States Patent
Wang et al.

(10) Patent No.: US 8,585,897 B2
(45) Date of Patent: Nov. 19, 2013

(54) CYLINDRICAL BACK WASHING PURIFICATION APPARATUS

(76) Inventors: Xun Wang, Zhengzhou (CN); Zhenbao Wang, Zhengzhou (CN); Zan Wang, Zhengzhou (CN); Cao Wang, Zhenghou (CN)

(*) Notice: Subject to any disclaimer, the term of this patent is extended or adjusted under 35 U.S.C. 154(b) by 276 days.

(21) Appl. No.: 13/132,709

(22) PCT Filed: Aug. 25, 2009

(86) PCT No.: PCT/CN2009/073475
§ 371 (c)(1),
(2), (4) Date: Jul. 7, 2011

(87) PCT Pub. No.: WO2010/063183
PCT Pub. Date: Jun. 10, 2010

(65) Prior Publication Data
US 2011/0253617 A1  Oct. 20, 2011

(30) Foreign Application Priority Data

Dec. 5, 2008 (CN) .................. 2008 2 0230636 U
Jul. 23, 2009 (CN) .................. 2009 2 0162219 U

(51) Int. Cl.
 B29C 47/68 (2006.01)
 B01D 29/66 (2006.01)
 B01D 35/12 (2006.01)
(52) U.S. Cl.
 USPC ........ 210/236; 210/323.2; 210/411; 210/408; 210/415; 425/197; 425/199
(58) Field of Classification Search
 USPC .............. 210/236, 323.2, 411, 408, 414, 415; 425/197, 199
 See application file for complete search history.

(56) References Cited

U.S. PATENT DOCUMENTS

| | | | |
|---|---|---|---|
| 4,597,870 A * | 7/1986 | Lambertus | 425/199 |
| 5,578,207 A | 11/1996 | Kreyenborg | |
| 7,124,895 B2 | 10/2006 | Ettlinger | |

FOREIGN PATENT DOCUMENTS

| | | |
|---|---|---|
| CN | 2161455 Y | 4/1994 |
| CN | 2161455 Y | 4/1994 |

(Continued)

OTHER PUBLICATIONS

International Preliminary Report on Patentability for International Application No. PCT/CN2009/073475 date of completion of this report Jan. 10, 2011.

*Primary Examiner* — Thomas M Lithgow
(74) *Attorney, Agent, or Firm* — Blank Rome LLP

(57) ABSTRACT

A cylindrical back washing purification apparatus comprises a main body (1), a cylindrical through hole (2) transversely provided in the main body (1), a plunger (4) slidably connected in the axial direction arranged in the through hole (2), a feed channel (6) and a discharge channel (8) connected with the through hole (2) on the main body (1). The outer peripheral portion of the foreside of the plunger (4) is concaved inward to form an annular cavity (10) with the inner wall of the through hole (2), the annular cavity (10) is connected with the feed channel (6), a "L"-type hole (12) which is connected with the discharge channel (8) is provided on the plunger (4) from fore to back in the axial direction, filtering holes (14) for connecting the annular cavity (10) with the "L"-type hole (12) are opened on the concaved peripheral face of the plunger (4) in the radial direction, a detachable filter screen (15) is coupled with the concaved peripheral face of the plunger (4). A strip (3) contacting with the inner wall of the through hole (2) is arranged in the annular cavity (10) on the plunger (4) in the axial direction; on the outer surface of the plunger (4), a semicircular groove (16) is provided on both sides of the discharge channel (8).

6 Claims, 3 Drawing Sheets

(56) References Cited

FOREIGN PATENT DOCUMENTS

| CN | 2368967 | Y | 3/2000 |
| CN | 2638967 | Y | 9/2004 |
| CN | 1665666 | A | 9/2005 |
| CN | 1665666 | A | 9/2005 |
| GB | 2159064 | A | 11/1985 |
| JP | 7001552 | A | 1/1995 |
| JP | 7001552 | A | 1/1995 |
| WO | WO-9847688 | A1 | 10/1998 |
| WO | 9920454 | A1 | 4/1999 |
| WO | WO-9929454 | A1 | 6/1999 |
| WO | WO-0154793 | A1 | 8/2001 |
| WO | WO-2004002715 | A1 | 1/2004 |

* cited by examiner

CYLINDRICAL BACK WASHING PURIFICATION APPARATUS

RELATED APPLICATIONS

This application is a National Phase of PCT Application No. PCT/CN2009/073475 (WO2010/0631863), filed Aug. 25, 2009, which claims priority to CN200820230636.5, filed Dec. 5, 2008 and CN200920162219.6, filed Jul. 23, 2009, the contents of which are hereby incorporated by reference in their entirity.

TECHNICAL FIELD

The invention relates to a fluid purifying device, and more particularly to a cylindrical backwash purifying device.

BACKGROUND OF THE INVENTION

At present, the single-cylinder filter sold on the market and used in various industries has disadvantages of large size, small filter area and low filter efficiency, and it has to be turned off before replacing its filter screen. Therefore, the continuous operation of the production is affected. The filter screen of a double-cylinder filter may be replaced when the double-cylinder filter is turned on, in contrast with the single-cylinder filter. However, the disadvantages of small effective filter area and low filter efficiency still exist if the filter screen is disposed on one side of the cylindrical surface where the inlet is located. Furthermore, in the operating process of the existing cylindrical filter, the material flow would form dead material somewhere, namely, material that is not moving. Such material cannot be timely removed, and affects the filtration effect and product quality.

SUMMARY OF THE INVENTION

To solve the disadvantages in the prior art, the invention provides a cylindrical backwash purifying device with a small size, a large effective filtering area, high working efficiency, and stable product quality.

To solve the above technical problems, the invention adopts the technical schemes as follows. A cylindrical backwash purifying device includes a main body within which a cylindrical through hole is transversely provided, wherein disposed within the through hole is a plunger tightly fitted with and axially slidably coupled with the through hole, and a feed channel and a discharge channel which are communicated with the through hole are provided in the main body. A cylindrical periphery of a fore portion of the plunger is depressed inwards and forms an annular cavity with an inner wall of the through hole, and the annular cavity is communicated with the feed channel. An L-shaped hole communicated with the discharge channel is provided in the plunger from front to back of the plunger in an axial direction. Filter holes communicated with the annular cavity and the L-shaped hole are provided in the depressed periphery of the plunger in a radial direction, and a detachable filter screen is coupled to the depressed periphery of the plunger.

A spacer bar in contact with the inner wall of the through hole is axially disposed in the annular cavity on the plunger, and a semi-ring shaped groove is disposed on an external surface of the plunger around two sides of the discharge channel.

A piston is axially disposed in the L-shaped hole in a fore end of the plunger, a fore end of the piston protrudes from the plunger, a fore power mechanism is connected to the fore end of the piston, and a rear power mechanism is connected to a rear end of the plunger.

The plunger is drivingly connected to a rotary driving mechanism.

A material introducing channel and an exhaust channel are provided in the plunger, respectively, the material introducing channel is located behind the feed channel, and the exhaust channel is located anteriorly to the annular cavity.

At least two of the cylindrical backwash purifying devices are disposed in series, in parallel, or in series and parallel, wherein the feed channels of all of the cylindrical backwash purifying devices are communicated with each other, and the discharge channels of all of the cylindrical backwash purifying devices are communicated with each other.

Included angles between the feed channels and the discharge channels of the multiple cylindrical backwash purifying devices disposed in series, in parallel, or in series and parallel are less than or equal to 180°.

The benefits achieved by using the above structures are as follows.

1. The fluid to be filtered enters the annular cavity via the feed channel. It is filtered by the filter screen and enters the L-shaped hole via the filter holes. Finally, the fluid is discharged out of the main body via the discharge channel to finish the filtering. Thus, the effective filter surface is a circular surface, which increases the filter surface and improves the working efficiency. In the operating process of the filter, the material flow moves in two directions from the inlet, and dead material, namely material flow that is not moving, would be formed at the place where two material flows meet. The dead material would age or deteriorate to be black in high temperature or other conditions for a long time, and once it flows out, the filtered material would be polluted. On this occasion, the plunger is rotated, and the spacer bar rotates therewith to scrape the dead material, making the dead material flow and filtered to avoid the flow of partial material which has deteriorated after detention, for such flow would affect the product quality. The semi-ring shaped groove keeps the discharge channel in always communication with the L-shaped hole when the plunger rotates rightwards and leftwards to ensure the continuity of material filtering.

2. When the filter screen needs to be cleaned or replaced, the rear power mechanism pushes the plunger out forwards, and the fore power mechanism rapidly pushes the piston to move backwards and pushes the material in the L-shaped hole to backwash the filter screen, so as to allow the filter screen to be used repeatedly.

3. The rotary driving mechanism drives the plunger to rotate rightwards and leftwards and drives the spacer bar to scrape the dead material in the annular cavity to ensure that there is no dead material in the annular cavity. Thus, the product quality is higher.

4. Every time the plunger is about to return to its original position after the filter screen is replaced, the air in the annular cavity needs to be expelled completely. A small quantity of fluid to be filtered is introduced via the material introducing channel to fill the annular cavity. When the air is expelled from the discharge channel, the fore end of the annular cavity has entered into the through hole.

5. At least two of the cylindrical backwash purifying devices are disposed in series, in parallel, or in series and parallel. The feed channels of all of the cylindrical backwash purifying devices are communicated with each other, and the discharge channels of all of the cylindrical backwash purifying devices are communicated with each other. Thus, not only the filter area is increased and the filter efficiency is improved, but also the filter screen may be cleaned or replaced respectively in a continuous working state, whereby the effect is obtained that the more cylindrical backwash purifying devices are combined, the less effect there is on the whole flow rate when an individual filter screen is being replaced or cleaned.

6. Included angles between the feed channels and the discharge channels of the multiple cylindrical backwash purifying devices disposed in series, in parallel, or in series and parallel are less than 180°. Thus, a plurality of feed channels and discharge channels may be communicated easily.

The invention has advantages of reasonable design, simple structure, small size, large effective filter area, good filter effect, allowing the filter screen to be cleaned or replaced with the device in an on state, long continuous working period, high working efficiency, and high product quality.

DETAILED DESCRIPTION OF THE EMBODIMENTS

Figure 1:
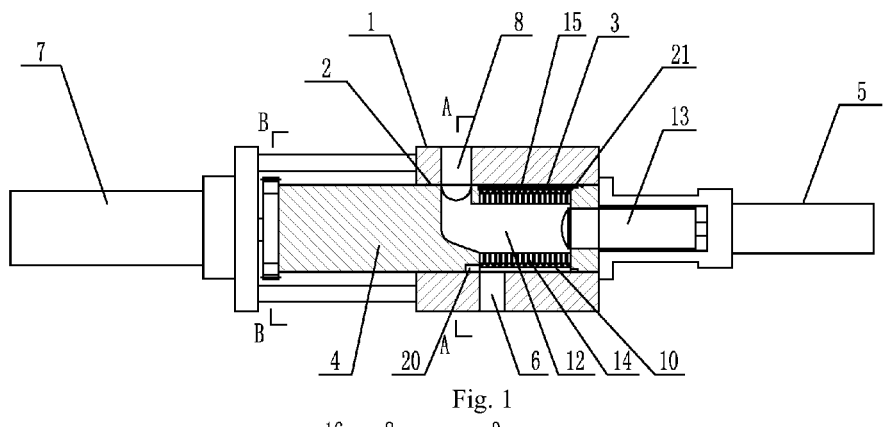
FIG. 1 is a structural schematic diagram of the invention.
Figure 2:
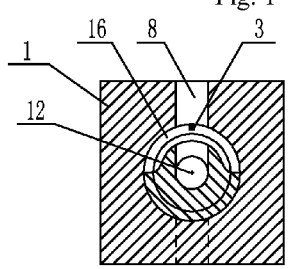
FIG. 2 is a sectional diagram taken along the line A-A in FIG. 1.
Figure 3:
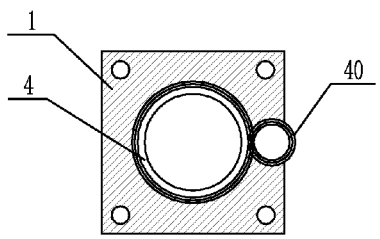
FIG. 3 is a first embodiment of the sectional diagram taken along the line B-B in FIG. 1.
Figure 4:
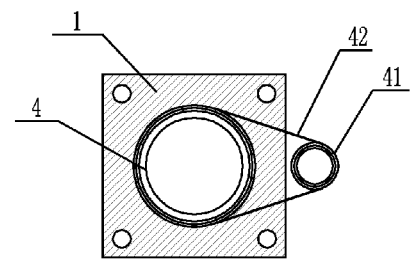
FIG. 4 is a second embodiment of the sectional diagram taken along the line B-B in FIG. 1.

As shown in FIG. 1 and FIG. 2, the cylindrical backwash purifying device of the present invention includes a main body 1, and a cylindrical through hole 2 is transversely and parallelly provided within the main body 1. A plunger 4 is disposed within the through hole 2, and it is closely fitted and axially slidably coupled with the through hole 2. The length of the plunger 4 is longer than that of the through hole 2. A feed channel 6 and a discharge channel 8, both connected with the through hole 2, are disposed in the front and back of the main body 1, respectively. The cylindrical periphery of a fore portion of the plunger 4 is depressed inwards, and thus forms an annular cavity 10 with an inner wall of the through hole 2, respectively. The annular cavity 10 is communicated with the feed channel 6. An L-shaped hole 12 communicated with the discharge channel 8 is provided in the middle from front to back of the plunger 4 in the axial direction. A piston 13 slidably coupled with the L-shaped hole 12, and located therein is disposed in the front of the annular cavity 11. The piston 13 protrudes from the plunger 4. A fore power mechanism 5 is connected to the fore end of the piston 13, and a rear power mechanism 7 is connected to the rear end of the plunger 4. Both of the fore power mechanism 5 and the rear power mechanism 7 adopt hydraulic cylinders. Filter holes 14 connecting the annular cavity 10 and the L-shaped hole 12 are provided in the depressed periphery of the plunger 4 in the radial direction. A filter screen 15 is detachably coupled to the depressed periphery of the plunger 4. A material introducing channel 20 and an exhaust channel 21 are provided in the plunger 4, respectively. The material introducing channel 20 is located behind the feed channel 6, and the exhaust channel 21 is located anteriorly to the annular cavity 10. A spacer bar 3 in contact with the inner wall of the through hole 2 is axially disposed in the annular cavity 10 on the plunger 4. A semi-ring shaped groove 16 is provided on the external surface of the plunger 4 around the two sides of the discharge channel 8. The plunger 4 is drivingly connected to a rotary driving mechanism. The rotary driving mechanism may drive the plunger 4 by a gear (as shown in FIG. 3), that is, a gear 40 engages with the plunger 4 to drive the plunger 4. The rotary driving mechanism also may drive the plunger 4 by a belt (as shown in FIG. 4), that is, a belt pulley 41 is drivingly connected to the plunger 4 via a belt 42.

Figure 5:
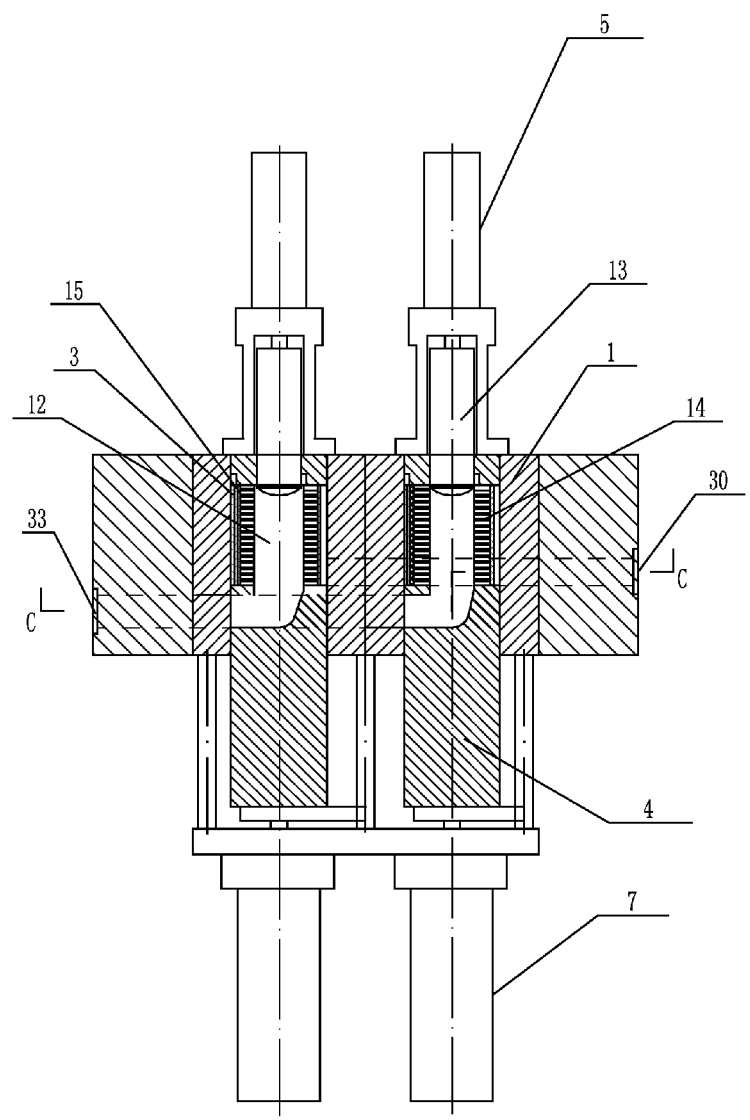
FIG. 5 is a structural schematic diagram showing multiple devices according to the present invention which are disposed in series and parallel.
Figure 6:
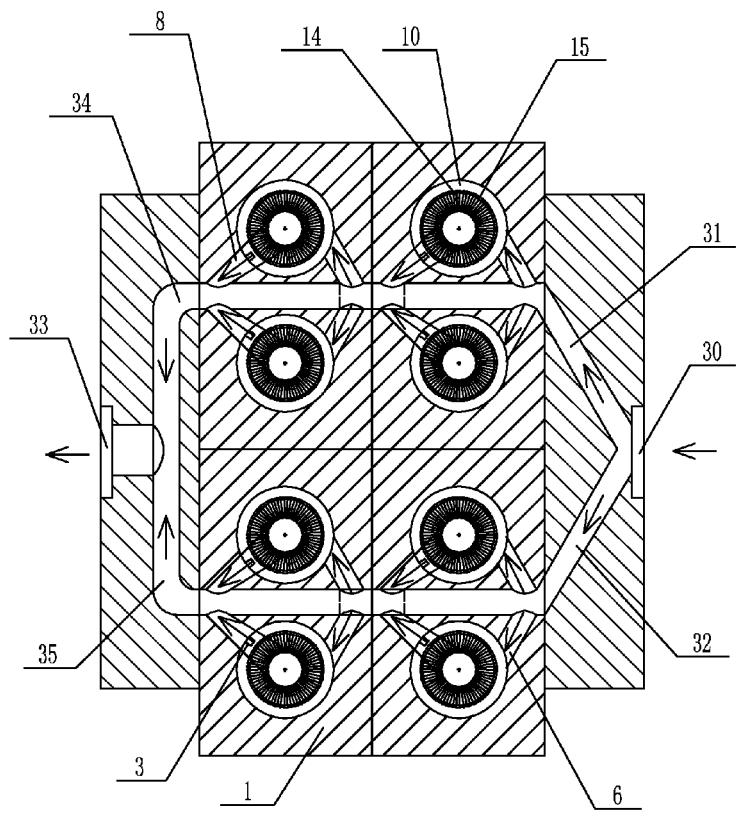
FIG. 6 is a sectional diagram taken along the line C-C in FIG. 5.

As shown in FIG. 5 and FIG. 6, eight cylindrical backwash purifying devices are disposed in series, in parallel or in series and parallel to form a combined backwash purifying apparatus. The feed inlet 30 of the combined backwash purifying apparatus runs into two channels, a material transporting channel 31 and a material transporting channel 32, and the discharge outlet 33 thereof also runs into two channels, a material draining channel 34 and a material draining channel 35. Four feed channels 6 of four cylindrical backwash purifying devices are all communicated with the material transporting channels 31, and four discharge channels 8 thereof are all communicated with the material draining channels 34. Four feed channels 6 of the other four cylindrical backwash purifying devices are all communicated with the material transporting channels 32, and four discharge channels 8 thereof are all communicated with the material draining channels 35. The included angle between the feed channel 6 and discharge channel 8 of each cylindrical backwash purifying device is less than 180°.

Figure 7:
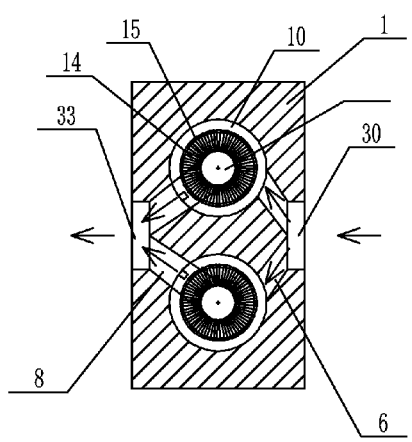
FIG. 7 is a structural schematic diagram showing the two devices according to the present invention which are disposed in series.

As shown in FIG. 7, two cylindrical backwash purifying device are connected in series, in parallel, or in series and parallel. Two feed channels 6 are connected to the feed inlet 30 together, and two discharge channels 8 are connected to the discharge outlet 33 together. The included angle between the feed channel 6 and the discharge channel 8 is less than 180°.

The arrows in FIG. 6 and FIG. 7 shows the directions in which the material flows to be filtered and purified.

In operation, a single cylindrical backwash purifying device shown in FIG. 1 and FIG. 2 may be used alone, and a plurality of combined backwash purifying apparatuses shown in FIG. 5 and FIG. 6 may also be used. The combined backwash purifying apparatus is taken as an example to illustrate the specific purifying and filtering process hereinbelow. The fluid material to be filtered enters the material transporting channel 31 and the material transporting channel 32 via the feed inlet 30, and enters the annular cavity 10 via the feed channel 6. Then, after the material is filtered by the filter screen 15, it enters the L-shaped hole 12 via the filter holes 14, passes through the discharge channel 8, and is discharged out of the main body 1 via the material draining channel 34 and the material draining channel 35, respectively, to finish the filtering process. When the filter screen 15 is blocked by the pollutant, the feed pressure is increased, and the pressure sensor at the inlet of the feed channel 6 sends a signal to warn that the filter screen needs to be cleaned. Then, the rear power mechanism 7 pushes the filter screen 15 on the plunger 4 out of the main body 1 completely, the fore power mechanism 5 pushes the piston 13 to move backwards, and the impurity is discharged by using the fluid material to backwash the filter screen 15. When the annular cavity 10 just enters the main body 1, a small quantity of material flow is introduced by the material introducing channel 20 to push the piston 13 back in a reverse direction, and the air in the annular cavity 10 is expelled out at the same time. Finally, the plunger 4 returns to its original position to continue the operation. When the filter screen 15 needs to be replaced after having been cleaned for many times, the rear power mechanism 7 pushes the plunger 4 out of the main body 1, and pulls the plunger 4 back after the filter screens 15 is replaced. When the annular cavity 10 just completely enters into the main body 1, the material introducing channel 20 is communicated with the feed channel 6 and introduces a small quantity of material flow to fill the annular cavity 10 gradually and expel the air therein out via the exhaust channel 21. After the air is all expelled, the plunger 4 is pulled back to its original position to enter an operation state. When the filter screen 15 of a cylindrical backwash purifying device is being replaced, the filter screens 15 of other cylindrical backwash purifying devices are still in operation, which ensures that the material flow entering and leaving the filter is not interrupted. with a plurality of combined backwash purifying apparatuses, the one-time filter quantity is fold increased. Moreover, the effective filter area of the filter screen 15 is circular in shape, and thus the effective filter area is large, which increases the work efficiency. When a single cylindrical backwash purifying device is used, the filter screen needs to be cleaned or replaced when the device is turned off.

In addition, in the operation of the cylindrical backwash purifying device, the material flow moves from the inlet in two directions, and dead material, namely material flow that is not moving, would be formed at the place where the two material flows meet in the annular cavity 10. The dead material may have changes such as aging in high temperature or other conditions for a long time. Once the dead material flows out, it would affect the product to some extent. On this occasion, the rotary driving mechanism is started, the plunger 4 rotatably drives the spacer bar to rotate 80° to 90° leftwards and rightwards, and the semi-ring shaped groove 16 keeps the discharge channel 8 always in communication with the L-shaped hole 12 to ensure the continuity of material filtering. The dead material is forced to flow up in time, avoiding the long-time detention of the dead material, and ensuring the filtration result of the material and product quality.

Certainly, a plurality of the cylindrical backwash purifying devices may be disposed in series, in parallel, or in series and parallel, the number thereof is not limited, and the variety thereof is also within the protection scope of the invention.

What is claimed is:

1. A cylindrical backwash purifying device, comprising a main body within which a cylindrical through hole is transversely provided, wherein a plunger closely fitted with and axially slidably coupled with the through hole is disposed within the through hole, and a feed channel and a discharge channel which are connected with the through hole are provided in the main body, the cylindrical backwash purifying device having a cylindrical periphery of a fore portion of the plunger is depressed inwards and forms an annular cavity with an inner wall of the through hole, the annular cavity is communicated with the feed channel, an L-shaped hole communicated with the discharge channel is made in the plunger from front to back of the plunger in an axial direction, filter holes communicated with the annular cavity and the L-shaped hole are made in the depressed periphery of the plunger in a radial direction, and a detachable filter screen is coupled to the depressed periphery of the plunger, wherein a spacer bar in contact with the inner wall of the through hole is axially disposed in the annular cavity on the plunger, and a semi-ring shaped groove is disposed on an external surface of the plunger around two sides of the discharge channel.

2. The cylindrical backwash purifying device according to claim 1, wherein a piston is axially disposed in the L-shaped hole in a fore end of the plunger, a fore end of the piston is protrudent from the plunger, a fore power mechanism is connected to the fore end of the piston, and a rear power mechanism is connected to a rear end of the plunger.

3. The cylindrical backwash purifying device according to claim 2, wherein the plunger is drivingly connected to a rotary driving mechanism.

4. The cylindrical backwash purifying device according to claim 3, wherein a material introducing channel and an exhaust channel are provided in the plunger, respectively, the material introducing channel is located behind the feed channel, and the exhaust channel is located anteriorly to the annular cavity.

5. The cylindrical backwash purifying device according to claim 4, wherein at least two of the cylindrical backwash purifying devices are disposed in series, in parallel, or in series and parallel, wherein the feed channels of all of the cylindrical backwash purifying devices are communicated, and the discharge channels of all of the cylindrical backwash purifying devices are communicated.

6. The cylindrical backwash purifying device according to claim 5, wherein included angles between the feed channels and the discharge channels of the multiple cylindrical backwash purifying devices disposed in series, in parallel, or in series and parallel are less than or equal to 180°.

\* \* \* \* \*